United States Patent
Espeland et al.

(10) Patent No.: US 11,765,427 B2
(45) Date of Patent: Sep. 19, 2023

(54) VIRTUAL REALITY VIDEO PLAYING METHOD, TERMINAL, AND SERVER

(71) Applicants: Huawei Technologies Co., Ltd., Shenzhen (CN); ForzaSys AS, Fornebu (NO)

(72) Inventors: Håvard N. Espeland, Fornebu (NO); Tomas Kupka, Fornebu (NO); Mattis Jeppsson, Fornebu (NO); Ragnar Langseth, Fornebu (NO); Andreas Petlund, Fornebu (NO); Carsten Griwodz, Fornebu (NO); Qiaoqiao Peng, Nanjing (CN); Pål Halvorsen, Fornebu (NO)

(73) Assignees: Huawei Technologies Co., Ltd., Shenzhen (CN); ForzaSys AS, Fornebu (NO)

( * ) Notice: Subject to any disclaimer, the term of this patent is extended or adjusted under 35 U.S.C. 154(b) by 0 days.

(21) Appl. No.: 17/100,452

(22) Filed: Nov. 20, 2020

(65) Prior Publication Data

US 2021/0076098 A1   Mar. 11, 2021

Related U.S. Application Data

(63) Continuation of application No. PCT/CN2019/087601, filed on May 20, 2019.

(30) Foreign Application Priority Data

May 22, 2018   (CN) .......................... 201810497645.9

(51) Int. Cl.
  *H04N 21/4402*  (2011.01)
  *H04N 21/437*   (2011.01)
  (Continued)

(52) U.S. Cl.
  CPC ... *H04N 21/440245* (2013.01); *H04N 21/437* (2013.01); *H04N 21/6405* (2013.01); *H04N 21/654* (2013.01); *H04N 21/816* (2013.01)

(58) Field of Classification Search
  CPC ......... H04N 21/440245; H04N 21/437; H04N 21/6405; H04N 21/654; H04N 21/816
  See application file for complete search history.

(56) References Cited

U.S. PATENT DOCUMENTS

| | | |
|---|---|---|
| 2012/0110516 A1 | 5/2012 | Tumanov |
| 2013/0169753 A1 | 7/2013 | Lee et al. |

(Continued)

FOREIGN PATENT DOCUMENTS

| | | |
|---|---|---|
| CN | 102204268 A | 9/2011 |
| CN | 102427463 B | 4/2015 |

(Continued)

OTHER PUBLICATIONS

KR/2020-7036638, Office Action, dated Aug. 24, 2022.

*Primary Examiner* — Yassin Alata
(74) *Attorney, Agent, or Firm* — Leydig, Voit and Mayer, Ltd.

(57) ABSTRACT

A method and system are described wherein a terminal sends, to a server, a video request message that includes an identifier of a virtual reality (VR) video. The VR video comprises N sub-bitstreams. The terminal receives a video response message sent by the server. The video response message indicates multicast addresses respectively corresponding to the N sub-bitstreams, and the terminal determines a target sub-bitstream based on a current field of view of a user, and obtains the target sub-bitstream based on a multicast address corresponding to the target sub-bitstream.

(Continued)

The multicast address is one of the multicast addresses, and the target sub-bitstream comprises at least one sub-bitstream of the N sub-bitstreams.

22 Claims, 4 Drawing Sheets

(51) Int. Cl.
 *H04N 21/6405* (2011.01)
 *H04N 21/654* (2011.01)
 *H04N 21/81* (2011.01)

(56) References Cited

U.S. PATENT DOCUMENTS

| | | |
|---|---|---|
| 2016/0260196 A1 | 9/2016 | Roimela et al. |
| 2017/0302978 A1 | 10/2017 | Hu et al. |
| 2017/0347163 A1 | 11/2017 | Wang |
| 2018/0074679 A1 | 3/2018 | Wang et al. |
| 2019/0362151 A1 | 11/2019 | Stokking et al. |
| 2019/0387214 A1* | 12/2019 | Huang ............... H04L 65/4084 |

FOREIGN PATENT DOCUMENTS

| | | | |
|---|---|---|---|
| CN | 104602008 A | 5/2015 | |
| CN | 104967879 A | 10/2015 | |
| CN | 105916060 A | 8/2016 | |
| CN | 106060570 A | 10/2016 | |
| CN | 106412563 A | 2/2017 | |
| CN | 106416239 A | 2/2017 | |
| CN | 106658011 A | 5/2017 | |
| CN | 106937180 A | 7/2017 | |
| CN | 107040794 A | 8/2017 | |
| CN | 107360448 A | 11/2017 | |
| CN | 107517385 A | 12/2017 | |
| CN | 107529064 A | 12/2017 | |
| CN | 107959861 A | 4/2018 | |
| EP | 2739040 B1 | 11/2017 | |
| JP | 2001352533 A | 12/2001 | |
| JP | 2014230055 A | 12/2014 | |
| JP | 2016158255 A | 9/2016 | |
| JP | 2017022769 A | 1/2017 | |
| JP | 2017527230 A | 9/2017 | |
| KR | 20140007076 A | 1/2014 | |
| KR | 20160054581 A | 5/2016 | |
| KR | 20170015938 A | 2/2017 | |
| WO | 2015184416 A1 | 12/2015 | |
| WO | 2016205670 A1 | 12/2016 | |
| WO | 2017200804 A1 | 11/2017 | |
| WO | 2017202700 A1 | 11/2017 | |
| WO | 2017202899 A1 | 11/2017 | |
| WO | 2018011054 A1 | 1/2018 | |
| WO | WO-2018011054 A1 * | 1/2018 | ........... G06T 19/006 |
| WO | 2018068236 A1 | 4/2018 | |
| WO | 2018072488 A1 | 4/2018 | |
| WO | 2018222996 A1 | 12/2018 | |

* cited by examiner

VIRTUAL REALITY VIDEO PLAYING METHOD, TERMINAL, AND SERVER

CROSS-REFERENCE TO RELATED APPLICATIONS

This application is a continuation of International Application No. PCT/CN2019/087601, filed on May 20, 2019, which claims priority to Chinese Patent Application No. 201810497645.9, filed on May 22, 2018. The disclosures of the aforementioned applications are hereby incorporated by reference in their entireties.

STATEMENT OF JOINT RESEARCH AGREEMENT

The subject matter and the claimed invention were made by or on the behalf of ForzaSys AS, of Martin Lingesvei 17,1364 Fornebu, Norway and Huawei Technologies Co., Ltd., of Shenzhen, Guangdong Province, P.R. China, under a joint research agreement titled "VR VIDEO PLAYING METHOD, TERMINAL, AND SERVER". The joint research agreement was in effect on or before the claimed invention was made, and that the claimed invention was made as a result of activities undertaken within the scope of the joint research agreement.

TECHNICAL FIELD

This application relates to the field of virtual reality, and in particular, to a VR video playing method, a terminal, and a server.

BACKGROUND

Virtual reality (VR) is a virtual environment constructed by a computer. The environment may come from a replica of a real world, or may be an imaginary world. People interact in real time in this virtual environment with three-dimensional space information. A VR 360-degree panoramic video is also referred to as a "panoramic video" or a "VR 360-degree video". The VR 360-degree video provides an observer an all-around physical space vision surrounded 360 degree horizontally (longitude) and 180 degree vertically (latitude). A user can enjoy an immersive experience by switching a field of view by changing a head position or using an input device such as a mouse or a remote control.

With development of technologies and improvements of user experience requirements, a resolution of a VR video is continuously improved. For the VR 360-degree video, a user actually views a small part of the VR 360-degree video. If a conventional encoding manner and a conventional transmission manner are used for the entire video, a lot of bandwidth resources are wasted.

SUMMARY

This application describes a VR video playing method, a terminal, and a server, to resolve a problem of a relatively large waste of bandwidth in an existing VR video playing process.

According to a first aspect of this application, a VR video playing method is provided, including: sending, by a terminal, a virtual reality VR video request message to a server, where the VR video request message includes an identifier of a to-be-played video; receiving, by the terminal, a VR video response message sent by the server, where the VR video response message indicates multicast addresses respectively corresponding to N sub-bitstreams of the to-be-played video; and determining, by the terminal, a target sub-bitstream based on a current field of view of a user, and obtaining the target sub-bitstream based on a multicast address corresponding to the target sub-bitstream.

In a possible implementation, the VR video response message further includes feature description information of the N sub-bitstreams, and the feature description information includes: spatial location information of the sub-bitstream and image quality description information of the sub-bitstream.

In a possible implementation, the determining, by the terminal, a target sub-bitstream based on a current field of view of a user includes: determining, by the terminal, the target sub-bitstream based on the current field of view of the user and the feature description information of the N sub-bitstreams, where the target sub-bitstream includes at least one sub-bitstream.

In a possible implementation, the determining, by the terminal, the target sub-bitstream based on the current field of view of the user and the feature description information of the N sub-bitstreams includes: selecting, by the terminal based on the current field of view of the user and the feature description information of the N sub-bitstreams, a sub-bitstream in the current field of view area as a high-resolution sub-bitstream, and selecting a bitstream in an area other than the current field of view area as a low-resolution bitstream.

In a possible implementation, the VR video response message further indicates unicast addresses respectively corresponding to N sub-bitstreams of dynamic adaptive streaming of the to-be-played video; and before the obtaining, by the terminal, the target sub-bitstream based on a multicast address corresponding to the target sub-bitstream, the method further includes: obtaining, by the terminal based on a unicast address of a sub-bitstream of dynamic adaptive streaming corresponding to the target sub-bitstream, the sub-bitstream of dynamic adaptive streaming corresponding to the target sub-bitstream.

According to a second aspect, this application provides a VR video playing method, and the VR video playing method includes: receiving, by a server, a VR video request message sent by a terminal, where the VR video request message includes an identifier of a to-be-played video; and sending, by the server, a VR video response message to the terminal based on the identifier of the to-be-played video, where the VR video response message indicates multicast addresses respectively corresponding to N sub-bitstreams of the to-be-played video.

In a possible implementation, before the receiving, by a server, a VR video request message sent by a terminal, the method further includes: determining, by the server, the N sub-bitstreams of the to-be-played video and the multicast addresses corresponding to all sub-bitstreams, where N is an integer greater than 1; and separately transmitting, by the server, the N sub-bitstreams to the corresponding multicast addresses.

In a possible implementation, the VR video response message further includes feature description information of the N sub-bitstreams.

According to a third aspect, this application provides a terminal. The terminal includes a module or a means configured to perform the method provided in the first aspect and the implementations of the first aspect.

According to a fourth aspect, this application provides a server. The server includes a module or a means configured to perform the method provided in the second aspect and the implementations of the second aspect.

According to a fifth aspect, this application provides a terminal. The terminal includes a memory, a processor, and a communications interface.

The memory is configured to store a program, and the communications interface is configured to perform wired or wireless communication with another device.

The processor invokes the program stored in the memory, to perform the method provided in the first aspect and the implementations of the first aspect.

According to a sixth aspect, this application provides a server. The server includes a memory, a processor, and a communications interface.

The memory is configured to store a program, and the communications interface is configured to perform wired or wireless communication with another device.

The processor invokes the program stored in the memory, to perform the method provided in the second aspect and the implementations of the second aspect.

According to a seventh aspect, this application provides a computer storage medium. The computer storage medium is configured to store a program, and the program is used to perform any method in the first aspect and the second aspect.

In this application, the VR video playing method, the terminal, and the server are provided. The terminal sends the VR video request message to the server, and the server sends the VR video response message to the terminal. The VR video response message indicates the multicast addresses respectively corresponding to the N sub-bitstreams of the to-be-played video, so that the terminal determines the target sub-bitstream based on the current field of view of the user, and obtains the target sub-bitstream from the multicast address corresponding to the target sub-bitstream. In this way, a multicast address is allocated to each sub-bitstream of the to-be-played video, so that the terminal can determine the required sub-bitstreams based on the current field of view, and obtains these currently required sub-bitstreams without receiving the video stream of the entire to-be-played video. This greatly saves bandwidths.

DESCRIPTION OF EMBODIMENTS

Figure 1:
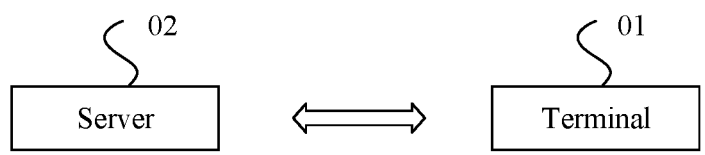
FIG. 1 is a schematic structural diagram of a VR system according to an embodiment of this application.

FIG. 1 is a schematic structural diagram of a VR system according to an embodiment of this application. As shown in FIG. 1, the system includes a server 02 and a terminal 01.

The server 02 may communicate with the terminal 01 by using a wired or wireless network. Specifically, the terminal 01 needs to request a video from the server 02 by using the network.

The terminal 01 may be various devices that support VR playing, such as a computer, VR glasses, and a tablet computer. This is not specifically limited in this application.

The server 02 may further be connected to a camera device, to obtain a video resource. The camera device herein may be a camera lens, a video camera, or the like.

The server 02 places a processed video on the server 02, and the terminal 01 may request, from the server 02, an address of the stored video.

In a transmission solution based on a field of view (FOV), there is a hybrid transmission solution, which is referred to as a tile-based transmission solution in the industry. In this solution, a panoramic frame is divided into a plurality of sub-blocks for encoding, and each sub-block can be independently transmitted and decoded. Each sub-block is referred to as a tile. In addition, a low-resolution panoramic video stream is further encoded, and the low-resolution panoramic video stream may be implemented by reducing a bit rate or a resolution of an original panoramic video stream.

The terminal applies to the server for a required high-resolution tile bitstream and a required low-resolution panoramic video stream based on a to-be-displayed field of view and a to-be-displayed orientation. An image corresponding to the high-resolution tile bitstream is viewed by a user in a field of view area. An image corresponding to the low-resolution panoramic bitstream can be immediately viewed when the field of view is switched, and a high-resolution tile bitstream corresponding to the new field of view is requested.

However, in current solutions, an entire video stream is transmitted based on one multicast address. This is inconvenient to implement the tile-based transmission solution. This application provides a new playing method for a multicast playing manner of a VR video, to implement specific processing of the tile-based transmission solution.

Figure 2:
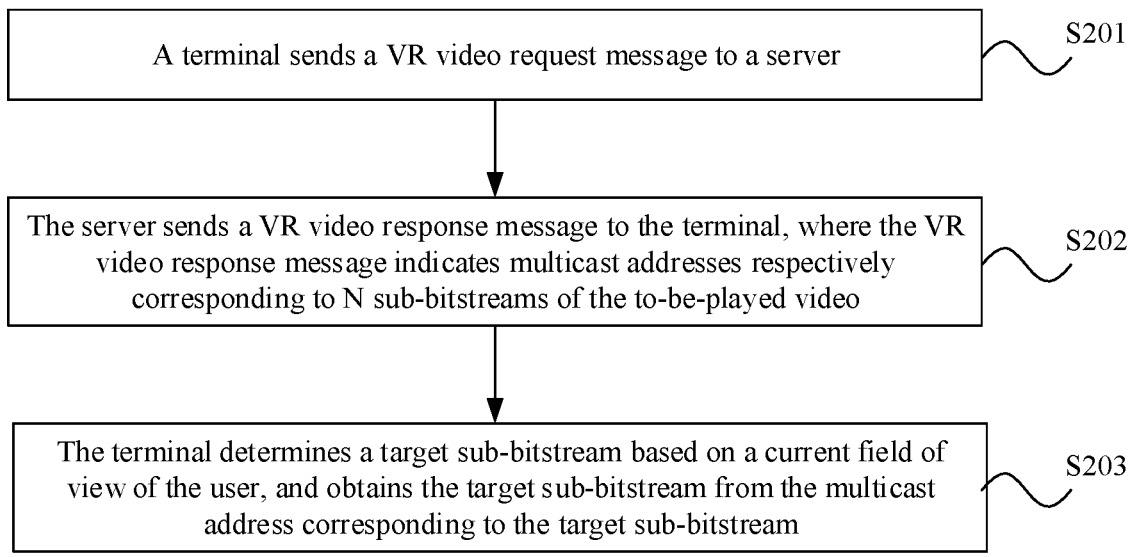
FIG. 2 is a schematic flowchart of a VR video playing method according to an embodiment of this application.

FIG. 2 is a schematic flowchart of a VR video playing method according to an embodiment of this application. As shown in FIG. 2, the method includes the following steps.

S201: A terminal sends a VR video request message to a server.

The VR video request message includes an identifier of a to-be-played video.

During specific implementation, an application program (APP) for playing VR may be installed on the terminal. After accessing a network, the terminal sends the VR video request message by using the app. A user may perform an operation on the app of the terminal, to indicate that a video needs to be played, and the app sends the VR video request message to the server. However, this is not limited thereto.

S202: The server sends a VR video response message to the terminal, where the VR video response message indicates multicast addresses respectively corresponding to N sub-bitstreams of the to-be-played video.

In this embodiment, a multicast address is configured for each sub-bitstream. The VR video response message may carry identifiers of the sub-bitstreams and the multicast addresses corresponding to all sub-bitstreams. To be specific, the terminal obtains identifiers (IDs) of all sub-bitstreams included in a 360-degree panoramic video and corresponding multicast addresses.

S203: The terminal determines a target sub-bitstream based on a current field of view of the user, and obtains the target sub-bitstream from the multicast address corresponding to the target sub-bitstream.

After obtaining the identifiers of all the sub-bitstreams included in the 360-degree panoramic video and the corresponding multicast addresses, the terminal determines, based on a current field of view area, to be specific, the field of view area that the user is about to view, which sub-bitstreams need to be received, and obtains the sub-bitstreams from the multicast addresses corresponding to the sub-bitstreams that need to be received.

After receiving the target sub-bitstream, the terminal decodes and renders the sub-bitstreams in a same manner of processing the 360-degree panoramic video, and then plays the sub-bitstreams to the user.

In this embodiment, the terminal sends the VR video request message to the server, and the server sends the VR video response message to the terminal. The VR video response message indicates the multicast addresses respectively corresponding to the N sub-bitstreams of the to-be-played video, so that the terminal determines the target sub-bitstream based on the current field of view of the user, and obtains the target sub-bitstream from the multicast address corresponding to the target sub-bitstream. In this way, a multicast address is allocated to each sub-bitstream of the to-be-played video, so that the terminal can determine the required sub-bitstreams based on the current field of view, and obtains these currently required sub-bitstreams without receiving a video stream of the entire to-be-played video. This greatly saves bandwidths.

During specific implementation, the server first determines the N sub-bitstreams of the to-be-played video and the multicast addresses corresponding to all the sub-bitstreams, and respectively transmits the N sub-bitstreams to the corresponding multicast addresses. N is an integer greater than 1.

Based on a service plan, the server prepares content for the to-be-played video (which may be a 360-degree video stream). Specifically, the preparing may include real-time capturing of the to-be-played video, and division, encoding/transcoding, encapsulation, and the like on the sub-bitstreams based on sub-bitstream configuration information of the to-be-played video.

More specifically, the sub-bitstream configuration information of the to-be-played video includes feature description information of each sub-bitstream of the to-be-played video.

The feature description information includes: spatial location information of the sub-bitstream and image quality description information of the sub-bitstream. The spatial location information of the sub-bitstream refers to a location relationship of the sub-bitstream relative to the to-be-played video of the sub-bitstream, and includes information such as coordinates and an occupied resolution of the sub-bitstream in the to-be-played video. The image quality description information of the sub-bitstream may be information such as a bit rate and a resolution of the sub-bitstream.

The server generates a plurality of sub-bitstreams that match the sub-bitstream configuration information (tile configuration information), for example, the plurality of sub-bitstreams may be a high-resolution tile bitstream and a low-resolution panoramic bitstream, or may be tile bitstreams at a plurality of quality levels. Each sub-bitstream is a bitstream that can be independently decoded, may be a single tile bitstream, or may be the low-resolution panoramic bitstream. In other words, the high-resolution panoramic bitstream is divided into a plurality of sub-bitstreams which refer to as tile bitstreams, and the low-resolution panoramic bitstream may not be divided into sub-bitstreams.

Table 1 lists the tile configuration information.

TABLE 1

| ID of to-be-played video | Resolution of to-be-played video | ID of sub-bitstream | Description of sub-bitstream | Spatial location information of sub-bitstream | Quality information of sub-bitstream: bit rate (Mbps) | Others |
|---|---|---|---|---|---|---|
| A1234 | 3840 × 1920 | 0 | Tile 0 | [0, 0, 1280, 640, 1280, 640] | 2 | |
| | | 1 | Tile 1 | [1280, 0, 2560, 640, 1280, 640] | 2 | |
| | | 2 | Tile 2 | [2560, 0, 3840, 640, 1280, 640] | 2 | |
| | | 3 | Tile 3 | [0, 640, 1280, 1280, 1280, 640] | 2 | |
| | | 4 | Tile 4 | [1280, 640, 2560, 1280, 1280, 640] | 2 | |
| | | 5 | Tile 5 | [2560, 640, 3840, 1280, 1280, 640] | 2 | |
| | | 6 | Tile 6 | [0, 1280, 1280, 1920, 1280, 640] | 2 | |
| | | 7 | Tile 7 | [1280, 1280, 2560, 1920, 1280, 640] | 2 | |
| | | 8 | Tile 8 | [2560, 1280, 3840, 1920, 1280, 640] | 2 | |
| | | 9 | Low-resolution panorama | [0, 0, 3840, 1920, 1920, 960] | 1.5 | |

Description of the spatial location information in Table 1: Using [0, 0, 1280, 640, 1280, 640] corresponding to the tile 0 as an example, a zeroth number to a first number are 0 and 0 which indicate coordinates of the upper left corner of the tile in the to-be-played video. The second number and third number are 1280 and 640 which indicate coordinates of the lower right corner of the tile in the to-be-played video. The fourth number and fifth number are 1280 and 640 which indicate an image resolution of the tile.

Then, a multicast address is allocated to each sub-bitstream, and the sub-bitstream is transmitted based on a corresponding multicast address. Specifically, an operator may allocate a multicast address to each sub-bitstream of the to-be-played video on the server, or the server may automatically allocate a multicast address to each sub-bitstream of the to-be-played video according to a preset rule. This is not limited in this application.

Correspondingly, in an embodiment, the VR video response message may further include feature description information of the N sub-bitstreams. The feature description information includes: spatial location information of the sub-bitstream and image quality description information of the sub-bitstream.

After obtaining the multicast address corresponding to each sub-bitstream, the server may generate triplet information: an identifier of the sub-bitstream, the multicast address of the sub-bitstream, and the feature description information of the sub-bitstream. After receiving the VR video request message sent by the terminal, the server adds the triplet information to the VR video response message, and sends the VR video response message to the terminal.

For example, after generating the triplet information, the server may establish information in Table 2.

TABLE 2

| ID of to-be-played video | Triplet information of sub-bitstream | | |
| --- | --- | --- | --- |
| | ID of sub-bitstream | Feature description information: spatial location/quality (bit rate, Mbps) | Multicast address |
| A1234 | 0 | [0, 0, 1280, 640, 1280, 640]/2 | 232.63.43.163 |
| | 1 | [1280, 0, 2560, 640, 1280, 640]/2 | 232.62.13. 115 |
| | 2 | [2560, 0, 3840, 640, 1280, 640]/2 | 232.195.254.221 |
| | 3 | [0, 640, 1280, 1280, 1280, 640]/2 | 232.151.62.226 |
| | 4 | [1280, 640, 2560, 1280, 1280, 640]/2 | 232.198.224.57 |
| | 5 | [2560, 640, 3840, 1280, 1280, 640]/2 | 232.58.166.100 |
| | 6 | [0, 1280, 1280, 1920, 1280, 640]/2 | 232.66.154.209 |
| | 7 | [1280, 1280, 2560, 1920, 1280, 640]/2 | 232.184.215.130 |
| | 8 | [2560, 1280, 3840, 1920, 1280, 640]/2 | 232.16.254.120 |
| | 9 | [0, 0, 3840, 1920, 1920, 960]/1.5 | 232.18.94.216 |

In this case, that the terminal determines the target sub-bitstream based on the current field of view of the user may be that the terminal determines the target sub-bitstream based on the current field of view of the user and the feature description information of the N sub-bitstreams.

The terminal may obtain coordinate information of the current field of view area of the user, and matches the coordinate information with feature description information of all sub-bitstreams, to obtain a sub-bitstream corresponding to the current field of view area, and use the sub-bitstream as the target sub-bitstream.

In a specific implementation process, that the terminal determines the target sub-bitstream based on the current field of view of the user and the feature description information of the N sub-bitstreams may include: The terminal selects a sub-bitstream in the current field of view area as a high-resolution sub-bitstream, and selects a bitstream in an area other than the current field of view area as a low-resolution bitstream.

To be specific, to save bandwidths, a high-resolution video is provided for the current field of view area, and a low-resolution video is played in another area. In this way, the user can also see the video when switching the field of view, and then the terminal obtains a high-resolution sub-bitstream corresponding to the switched area.

Optionally, after the user switches the field of view, the terminal obtains, based on new field of view information, a target sub-bitstream corresponding to the new field of view. The terminal leaves a multicast group of a sub-bitstream that is not in the field of view area, joins a multicast group of a sub-bitstream that is in the new field of view area, and receives, based on a multicast address of the target sub-bitstream, the target sub-bitstream corresponding to the new field of view.

It should be noted that a resolution of the high-resolution sub-bitstream is greater than a first preset threshold, and a resolution of the low-resolution bitstream is less than a second preset threshold. Optionally, compared with the high-resolution sub-bitstream, the resolution of the low-resolution bitstream may be implemented by reducing half of the resolution horizontally and half of the resolution vertically. The low-resolution bitstream is not divided into sub-bitstreams, and may be a panoramic bitstream.

The sub-bitstream obtained by the terminal is the high-resolution sub-bitstream. Based on the sub-bitstream configuration information in Table 1, the server may generate a plurality of high-resolution sub-bitstreams and a low-resolution panoramic bitstream of the to-be-played video.

It is assumed that a 4K 360-degree panoramic video (resolution: 3840×1920) needs to be multicast, an ID of the 360-degree panoramic video is A1234, and tile configuration information of the 360-degree panoramic video is a manner of the high-resolution tile bitstream and the low-resolution panoramic bitstream (without dividing into tiles). For example, the high-resolution sub-bitstream may be implemented by evenly dividing a high-resolution panoramic bitstream into nine tiles according to 3×3, and the low-resolution panoramic bitstream is implemented by reducing half of the resolution of the high-resolution panoramic bitstream horizontally and half of the resolution of the high-resolution panoramic bitstream vertically.

The low-resolution panoramic bitstream may be generated in an encoding manner of a common video, and the high-resolution tiles may be encoded in a tile encoding manner of a high efficiency video coding (HEVC) standard. When encoding in the tile encoding manner of the HEVC standard, during a motion prediction, it should be noticed that a motion vector does not cross tile boundaries in time and space, to ensure that each tile can be independently decoded. After the encoding is completed, a bitstream is extracted. One tile corresponds to one bitstream file. Alternatively, each frame of the to-be-played video may be divided into nine sub-image videos based on a tile division manner in Table 1 before the encoding, and each sub-image video is encoded by using a common video encoder.

For example, referring to Table 2, it is assumed that coordinates of an upper left corner and a lower right corner that correspond to the current field of view area are [1000, 640] and [1960, 1280], respectively. It can be learned from the VR video response message that the field of view area covers areas of a tile 3 and a tile 4, the terminal may apply to join multicast addresses 232.151.62.226 and 232.198.224.57 corresponding to the tile 3 and the tile 4 (it can be learned from Table 2 that bit rates of the tile 3 and the tile 4 are 2 Mbps, which are high-resolution sub-bitstreams).

If the user turns the head horizontally and switches the field of view to areas corresponding to [2000, 640] and [2960, 1280], the new field of view area covers areas of the tile 4 and a tile 5, the tile 5 enters the current field of view area, and the tile 3 leaves the current field of view area. In this case, the terminal may apply to join a multicast address 232.58.166.100 corresponding to the tile 5, and applies to leave the multicast address 232.151.62.226 corresponding to the tile 3.

In the entire process, for the low-resolution panoramic bitstream, the terminal always joins a multicast address 232.18.94.216 of the low-resolution panoramic bitstream.

Optionally, the low-resolution panoramic bitstream may also be divided into N low-resolution sub-bitstreams.

That the terminal determines the target sub-bitstream based on the current field of view of the user and the feature description information of the N sub-bitstreams may include: The terminal selects the sub-bitstream in the current field of view area as the high-resolution sub-bitstream, and selects the sub-bitstream in the area other than the current field of view area as the low-resolution sub-bitstream.

For example, the sub-bitstreams may comprise high quality tile bitstreams divided according to 3×3 and low quality tile bitstreams divided according to 3×3, so there are 18 sub-bitstreams in total. The server may similarly generate, according to the foregoing implementation, multicast addresses respectively corresponding to the 18 sub-bitstreams whose IDs are 0 to 17. Sub-bitstreams whose IDs are 0 to 8 correspond to 9 high-resolution sub-bitstreams, and sub-bitstreams whose IDs are 8 to 17 correspond to 9 low-resolution sub-bitstreams. It is assumed that coordinates of an upper left corner and a lower right corner corresponding to the current field of view area are [1000, 640] and [1960, 1280], respectively. The field of view area covers the areas of the tile 3 and the tile 4. The terminal may apply to join the multicast addresses corresponding to the high-definition tile 3 and the high-definition tile 4, and join multicast addresses corresponding to the low-resolution sub-bitstreams corresponding to other areas, in other words, join the multicast addresses corresponding to the low-resolution sub-bitstreams whose IDs are 9, 10, 11, 14, 15, 16, or 17. It is assumed that the user rotates the head horizontally and switches the field of view to areas corresponding to [2000, 640] and [2960, 1280], so that the new field of view area covers the areas of the tile 4 and the tile 5. Sub-bitstream IDs that the terminal needs to join are 4, 5, 9, 10, 11, 12, 15, 16, and 17. A corresponding operation is to leave the multicast address of the tile 3, and join the multicast address of the tile 5.

Optionally, joining or leaving a multicast address may be implemented by sending, to a gateway corresponding to the terminal, a standard internet group management protocol (IGMP) join (Join) message or leave group (Leave Group) message. For example, if an identifier of the terminal (or an identifier of the app installed on the terminal) is 190.50.10.40, and the terminal wants to join a multicast address 232.198.224.57, the message format may be:

" . . . 190.50.10.40 232.198.224.57 IGMP V2 Membership Report/Join group 232.198.224.57 . . . ".

For another example, if the terminal wants to apply for joining two multicast addresses 232.198.224.57 and 232.58.166.100, the terminal may send two IGMP join messages to the gateway corresponding to the terminal. The specific message may be:

" . . . 190.50.10.40 232.198.224.57 IGMP V2 Membership Report/Join group 232.198.224.57 . . . "; and " . . . 190.50.10.40 232.58.166.100 IGMP V2 Membership Report/Join group 232.58.166.100 . . . ".

After a plurality of high-definition tile bitstreams are downloaded, each high-definition tile bitstream may be independently decoded, or the plurality of high-definition tile bitstreams may be combined into one bitstream for decoding. Finally, in a VR video playing and rendering manner, a decoded image is projected, based on location information of the decoded image, to a field of view area corresponding to a sphere. In addition, an image in the field of view area of the user is captured and presented to the user.

It should be noted that the foregoing server may also be a system formed by a plurality of servers, for example, may include a headend server, a management server, and a video stream server.

The headend server prepares content for the to-be-played video (which may be the 360-degree panoramic video stream). Specifically, the preparing may include real-time capturing, and division, encoding/transcoding, encapsulation, and the like on the sub-bitstreams based on the sub-bitstream configuration information of the to-be-played video.

The headend server transmits a plurality of sub-bitstreams that match the sub-bitstream configuration information (tile configuration information) to the video stream server.

The management server is also a management platform of a video multicast service. Similar to a traditional video multicast, an operator can plan and configure multicast addresses for a video stream (e.g., allocate a multicast address for each sub-bitstream) by using the management server, to start a video stream multicast service. The management server is configured to receive the VR video request message from the terminal, generate and send the VR video response message to the terminal.

The video stream server is configured to store video data that needs to be played, and transmit the video data based on corresponding multicast addresses indicated by the management server. In this application, the management server indicates the multicast addresses corresponding to all the sub-bitstreams, and the video server transmits the sub-bitstreams of the to-be-played video on the corresponding multicast addresses.

Certainly, the headend server, the management server, and the video stream server may alternatively be integrated into one server. This is not limited in this application.

In another optional embodiment, a VR video response message further indicates unicast addresses respectively corresponding to N sub-bitstreams of dynamic adaptive streaming of the to-be-played video.

Dynamic adaptive streaming may be dynamic adaptive streaming over hypertext transfer protocol (HTTP) (DASH).

Specifically, after preparing the N sub-bitstreams of the to-be-played video, the headend server obtains a real-time transport protocol RTP data packets of the sub-bitstreams, and injects the RTP data packets of the sub-bitstreams into a video stream server. The headend server may further perform encapsulation and slicing of DASH spatial representation description (DASH-SRD) on the sub-bitstreams to obtain DASH segments of the sub-bitstreams. Further, a service address of the DASH segments is allocated, and an association relationship between the to-be-played video and the service address of the DASH segments is established. The DASH segments correspond to high-resolution sub-bitstreams of the to-be-played video.

The encapsulated and sliced DASH segments are stored in the service address (unicast address) corresponding to the DASH segments on a unicast server.

Separate interfaces are respectively used for the DASH segments and the RTP data packets of the sub-bitstreams.

The VR video request message of the terminal not only requests the multicast addresses of the to-be-played video, but also requests the unicast addresses of the to-be-played video. The VR video response message returned by the server carries the multicast addresses corresponding to the RTP packets of the N sub-bitstreams of the to-be-played video, and the unicast addresses corresponding to the N sub-bitstreams of the DASH segments of the to-be-played video.

In this embodiment, when the field of view is switched, sub-bitstream data of a new field of view needs to be first requested by using the unicast addresses corresponding to the DASH segments, in other words, the high-resolution sub-bitstreams are obtained from the unicast addresses of the DASH segments of the sub-bitstreams corresponding to a new field of view area, and are decoded and displayed. After multicast data reach a playing synchronization point, the multicast data is displayed (to be specific, after a target sub-bitstream is obtained from the multicast addresses of the sub-bitstreams corresponding to the new field of view area, the multicast data is displayed), and the DASH unicast data is stopped from being requested.

Figure 3:
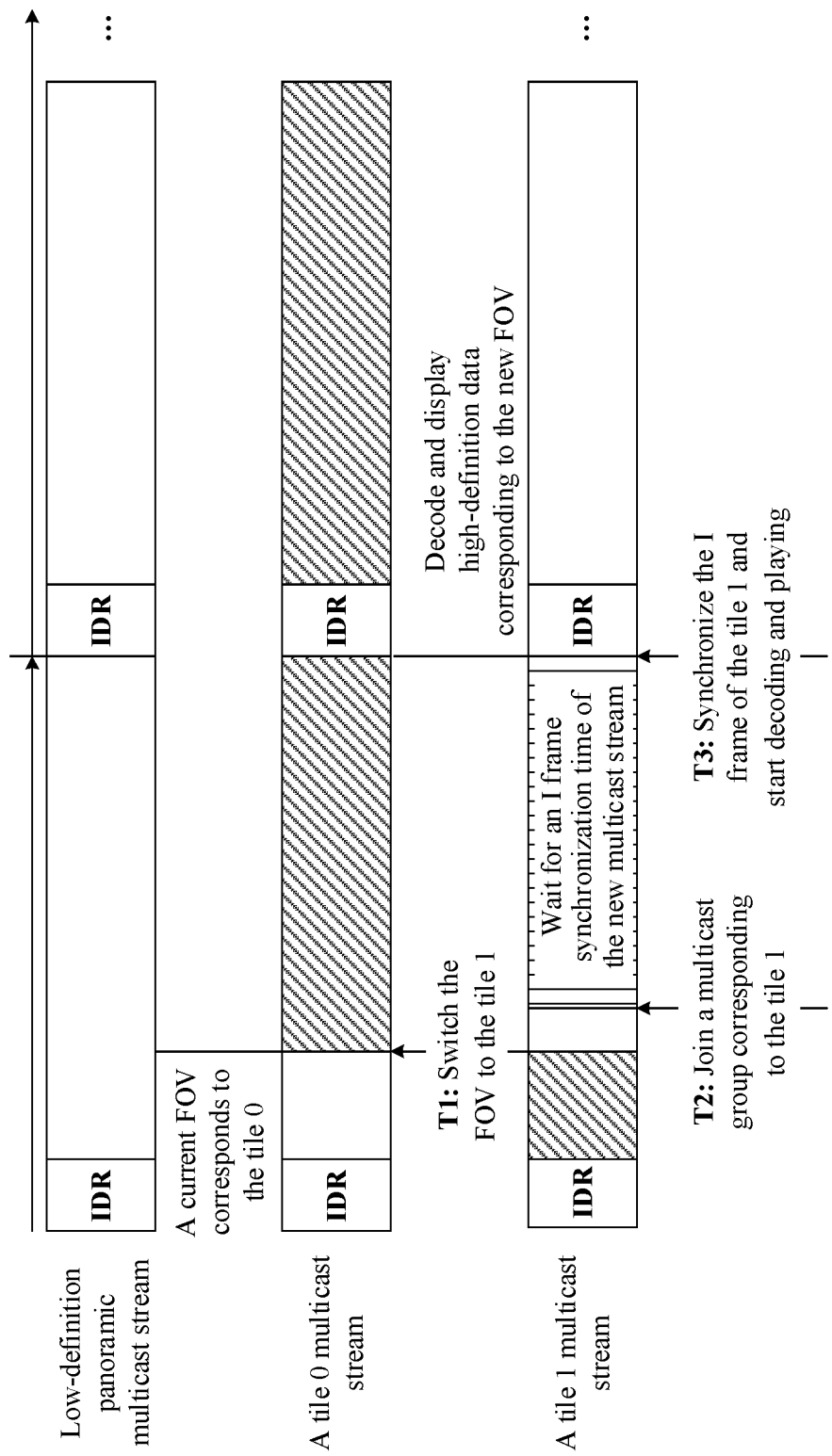
FIG. 3 is a schematic diagram of a delay in a VR video playing method according to an embodiment of this application.
Figure 4:
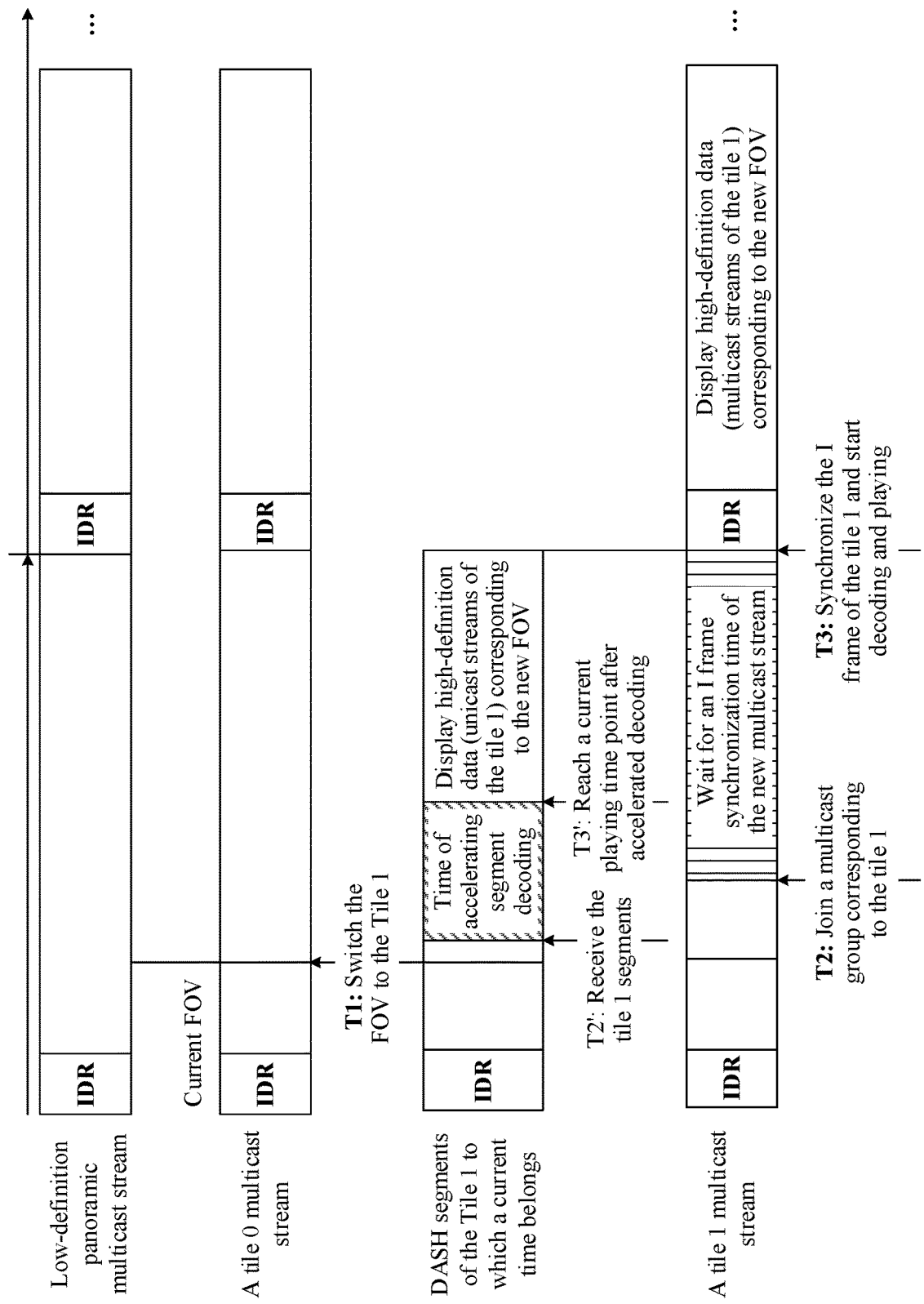
FIG. 4 is a schematic diagram of a delay in a VR video playing method according to another embodiment of this application.

FIG. 3 is a schematic diagram of a delay in a VR video playing method according to an embodiment of this application. FIG. 4 is a schematic diagram of a delay in a VR video playing method according to another embodiment of this application.

In the solution provided in this embodiment, compared with the manner of obtaining a high-definition sub-bitstream in only a multicast manner, the delay of obtaining the high-definition sub-bitstream can be reduced in the process of switching the field of view.

FIG. 3 shows a delay generated in only a multicast manner of sub-bitstreams in the embodiment shown in FIG. 2. FIG. 4 shows a delay generated in a DASH segment manner which is added in this embodiment. It can be learned that in the process of switching the field of view of the user, in the embodiment corresponding to FIG. 4, the user can view the high-resolution video in a shorter time after switching the field of view.

An instantaneous decoding refresh (IDR) frame represents a first frame of an internal picture (I) frame.

For example, referring to Table 2, it is assumed that coordinates of an upper left corner and a lower right corner corresponding to a current field of view of a user are [1000, 640] and [1960, 1280], respectively. The field of view area covers areas of a tile 3 and a tile 4. In this case, multicast groups corresponding to the tile 3, the tile 4 and the low-resolution panoramic bitstream are currently joined by a terminal.

It is assumed that the user horizontally turns the head at a moment of 300 ms of a current group of pictures (GOP) (it is assumed that a coding parameter is: the GOP length is 2 seconds and a DASH segment duration is 2 seconds). The field of view is changed to areas corresponding to [2000, 640] and [2960, 1280]. The field of view covers areas of the tile 4 and a tile 5, in other words, the tile 5 enters the current field of view, and the tile 3 leaves the current field of view.

In this case, the terminal needs to request a high-resolution video of the tile 5 again. Specifically, when applying for joining the multicast address 232.58.166.100 corresponding to the tile 5, the terminal requests to download a DASH segment (high-resolution segment) of the tile 5 from a unicast server. It is assumed that the DASH segment of the tile 5 arrives at a moment of 500 ms of the current GOP. The terminal enables another decoder to accelerate decoding the DASH segment. It is assumed that at 1000 ms of the GOP, the DASH segment of the tile 5 arrives at the current playing moment after decoding. In this case, the high-resolution data of the DASH segment can be used to cover the low-resolution data of the corresponding area.

One possibility is that, it is assumed that the terminal also joins the multicast address of the tile 5 at the moment of 500 ms of the GOP, but the currently received multicast data does not have an I frame and cannot be decoded. The multicast data of the tile 5 can be decoded only at a start moment of a next GOP, to be specific, after 1500 ms, the multicast data of the tile 5 (the next GOP) is started to be decoded and displayed. After that, the DASH segment of the tile 5 is not requested.

Figure 5:
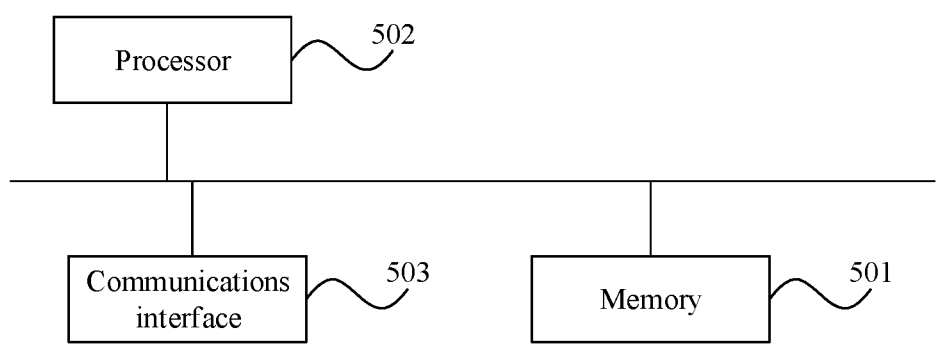
FIG. 5 is a schematic structural diagram of a terminal according to an embodiment of this application.

FIG. 5 is a schematic structural diagram of a terminal according to an embodiment of this application. As shown in FIG. 5, the terminal includes a memory 501, a processor 502, and a communications interface 503.

The memory 501 is configured to store a program.

The communications interface 503 is configured to perform wired or wireless communication with another device.

The processor 502 invokes the program stored in the memory 501, to perform the following method:

sending a virtual reality VR video request message to a server, where the VR video request message includes an identifier of a to-be-played video; receiving a VR video response message sent by the server, where the VR video response message indicates multicast addresses respectively corresponding to N sub-bitstreams of the to-be-played video; and determining a target sub-bitstream based on a current field of view of a user, and obtaining the target sub-bitstream based on a multicast address corresponding to the target sub-bitstream.

In this embodiment, the terminal sends the VR video request message to the server, and the server sends the VR video response message to the terminal. The VR video response message indicates the multicast addresses respectively corresponding to the N sub-bitstreams of the to-be-played video, so that the terminal determines the target sub-bitstream based on the current field of view of the user, and obtains the target sub-bitstream from the multicast address corresponding to the target sub-bitstream. In this way, a multicast address is allocated to each sub-bitstream of the to-be-played video, so that the terminal can determine the required sub-bitstreams based on the current field of view, and obtains these currently required sub-bitstreams without receiving a video stream of the entire to-be-played video. This greatly saves bandwidths.

Further, the VR video response message further includes feature description information of the N sub-bitstreams, and the feature description information includes: spatial location information of the sub-bitstream and image quality description information of the sub-bitstream.

In an implementation, the processor 502 is specifically configured to: determine the target sub-bitstream based on the current field of view of the user and the feature description information of the N sub-bitstreams. The target sub-bitstream includes at least one sub-bitstream.

In another implementation, the processor 502 is specifically configured to select, based on the current field of view of the user and the feature description information of the N sub-bitstreams, a sub-bitstream in the current field of view area as a high-resolution sub-bitstream, and select a bitstream in an area other than the current field of view area as a low-resolution bitstream.

In still another implementation, the VR video response message further indicates unicast addresses respectively corresponding to N sub-bitstreams of dynamic adaptive streaming of the to-be-played video.

Correspondingly, the processor 502 is further configured to obtain, based on the unicast address of the sub-bitstream of dynamic adaptive streaming corresponding to the target sub-bitstream, the sub-bitstream of dynamic adaptive streaming corresponding to the target sub-bitstream.

Figure 6:
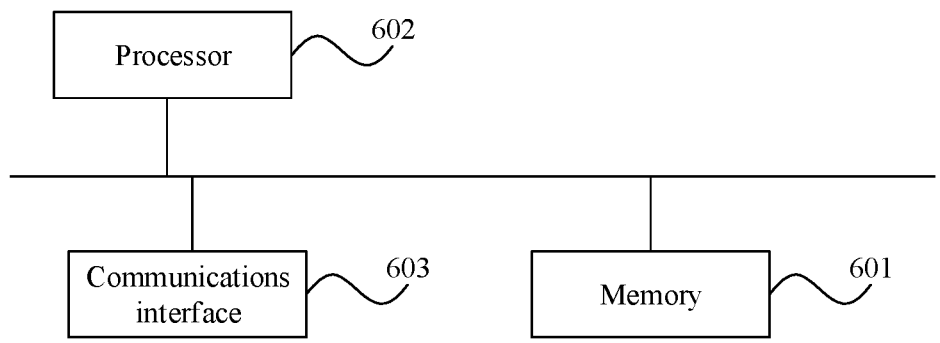
FIG. 6 is a schematic structural diagram of a server according to an embodiment of this application.

FIG. 6 is a schematic structural diagram of a server according to an embodiment of this application. As shown in FIG. 6, the terminal includes: a memory 601, a processor 602, and a communications interface 603.

The memory 601 is configured to store a program.

The communications interface 603 is configured to perform wired or wireless communication with another device.

The processor 602 invokes the program stored in the memory 601, to perform the following method: receiving a VR video request message sent by a terminal, where the VR video request message includes an identifier of a to-be-played video; and sending a VR video response message to the terminal based on the identifier of the to-be-played video, where the VR video response message indicates multicast addresses respectively corresponding to N sub-bitstreams of the to-be-played video.

Optionally, the processor 602 is further configured to: determine the N sub-bitstreams of the to-be-played video and the multicast addresses corresponding to all sub-bitstreams, where N is an integer greater than 1; and separately transmit the N sub-bitstreams to the corresponding multicast addresses.

Optionally, the VR video response message further includes feature description information of the N sub-bitstreams.

Optionally, when some or all of the VR video playing methods in the foregoing embodiments are implemented by using software, the terminal or the server may alternatively include only a processor. The memory configured to store the program is located outside the apparatus. The processor is connected to the memory by using a circuit/wire, and is configured to read and execute the program stored in the memory.

The processor may be a central processing unit (CPU), a network processor (NP), or a combination of a CPU and an NP.

The processor may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory may include a volatile memory, for example, a random access memory (RAM); or the memory may include a non-volatile memory, for example, a flash memory, a hard disk drive (HDD), or a solid-state drive (SSD); or the memory may include a combination of the foregoing types of memories.

The terminal and the server are configured to perform the foregoing method embodiments. Implementation principles and technical effects of the terminal and the server are similar to those of the method embodiments. Details are not described herein again.

This application further provides a computer storage medium. The computer storage medium is configured to store a program, and the program is used to perform the foregoing method.

The terminal and the server provided in this application may also include modules or means configured to perform the foregoing method. An implementation principle and a technical effect are similar to those of the foregoing method. Details are not described herein again.

What is claimed is:

1. A method for playing a virtual reality (VR) video performed by a terminal, the method comprising:
    sending a video request message to a server, wherein the video request message is used to request for a virtual reality (VR) video, wherein the VR video comprises N sub-bitstreams, wherein each sub-bitstream of the N sub-bitstreams provides a spatial domain portion of the VR video;
    receiving a video response message from the server, wherein the video response message indicates N multicast addresses of the N sub-bitstreams, wherein each sub-bitstream of the N multicast sub-bitstreams is multicast transmitted according to a corresponding multicast address of the N multicast addresses; and
    obtaining, based on a field of view of a user, M target sub-bitstreams in parallel based on M multicast addresses respectively corresponding to the M target sub-bitstreams of the field of view,
    wherein the N sub-bitstreams include the M target sub-bitstreams,
    wherein the N multicast addresses include the M multicast addresses, and
    wherein M is an integer greater than 1 and less than N.

2. The method according to claim 1, wherein the VR video response message further comprises feature description information of the N sub-bitstreams, and
    wherein the feature description information comprises:
        spatial location information of each sub-bitstream of the N sub-bitstreams, and
        image quality description information of each sub-bitstream of the N sub-bitstreams.

3. The method according to claim 2, wherein the-method further comprises:
    selecting at least one sub-bitstream from the N sub-bitstreams in the current field of view area as a high-resolution sub-bitstream, and
    selecting at least one sub-bitstream from the N sub-bitstreams in an area other than the current field of view area as a low-resolution sub-bitstream.

4. The method according to claim 1, wherein the VR video further comprises N dynamic adaptive streaming sub-bitstreams corresponding to the N sub-bitstreams, and
    wherein the VR video response message further indicates N unicast addresses respectively corresponding to the N dynamic adaptive streaming sub-bitstreams.

5. The method according to claim 1, wherein the N dynamic adaptive streaming sub-bitstreams comprise high-resolution sub-bitstreams of to-be-played video.

6. The method of claim 4, wherein the method further comprises:
    obtaining, in accordance with determining a field of view is switched, a new target sub-bitstream of the N sub-bitstreams based on one of the N multicast addresses;

wherein, before commencing the obtaining the new target sub-bitstream of the N target sub-bitstreams, the method further comprises obtaining a new dynamic adaptive streaming sub-bitstream corresponding to the new target sub-bitstream, by using a unicast address, of the N unicast addresses.

7. A method for playing a virtual reality (VR) video performed by a server, the method comprising:
receiving a video request message sent by a terminal, wherein the video request message is used to request for a VR video, wherein the VR video comprises N sub-bitstreams, and wherein each sub-bitstream of the N sub-bitstreams provides a spatial domain portion of the VR video; and
sending a video response message to the terminal,
wherein the video response message indicates N multicast addresses of the N sub-bitstreams, wherein each sub-bitstream of the N multicast sub-bitstreams is transmitted to a multicast address of the N multicast addresses;
wherein M target sub-bitstreams are obtained, based on a field of view of a user, in parallel by the terminal based on M multicast addresses respectively corresponding to the M target sub-bitstreams of the field of view,
wherein the N sub-bitstreams include the M target sub-bitstreams, and
wherein the N multicast addresses include the M multicast addresses; and wherein M is an integer greater than 1 and less than N.

8. The method according to claim 7, wherein before the receiving, the method further comprises:
determining the N sub-bitstreams and the N multicast addresses respectively corresponding to the N sub-bitstreams, wherein N is an integer greater than 1; and
separately transmitting the N sub-bitstreams to the corresponding N multicast addresses.

9. The method according to claim 7, wherein the video response message further comprises feature description information of the N sub-bitstreams.

10. The method according to claim 7, wherein the N dynamic adaptive streaming sub-bitstreams comprise high-resolution sub-bitstreams of to-be-played video.

11. The method according to claim 7, wherein the VR video further comprises N dynamic adaptive streaming sub-bitstreams corresponding to the N sub-bitstreams, and
wherein the video response message further indicates N unicast addresses respectively corresponding to the N dynamic adaptive streaming sub-bitstreams.

12. A terminal comprising:
a processor, and
a memory including computer-executable instructions that, when executed by the processor, cause the terminal to perform a method including:
sending a video request message to a server, wherein the video request message is used to request for a virtual reality (VR) video, wherein the VR video comprises N sub-bitstreams, wherein each sub-bitstream of the N sub-bitstreams provides a spatial domain portion of the VR video;
receiving a video response message from the server, wherein the video response message indicates N multicast addresses of the N sub-bitstreams, wherein each sub-bitstream of the N multicast sub-bitstreams is multicast transmitted according to a corresponding multicast address of the N multicast addresses; and
obtaining, based on a field of view of a user, M target sub-bitstreams in parallel based on M multicast addresses respectively corresponding to the M target sub-bitstreams of the field of view,
wherein the N sub-bitstreams include the M target sub-bitstreams,
wherein the N multicast addresses include the M multicast addresses, and
wherein M is an integer greater than 1 and less than N.

13. The terminal according to claim 12, wherein the VR video response message further comprises feature description information of the N sub-bitstreams, and
wherein the feature description information comprises:
spatial location information of each sub-bitstream of the N sub-bitstreams, and
image quality description information of each sub-bitstream of the N sub-bitstreams.

14. The terminal according to claim 13, wherein the method further includes:
selecting at least one sub-bitstream from the N sub-bitstreams in the current field of view area as a high-resolution sub-bitstream, and
selecting at least one sub-bitstream from the N sub-bitstreams in an area other than the current field of view area as a low-resolution sub-bitstream.

15. The terminal according to claim 12, wherein the VR video further comprises N dynamic adaptive streaming sub-bitstreams corresponding to the N sub-bitstreams, and
wherein the VR video response message further indicates N unicast addresses respectively corresponding to the N dynamic adaptive streaming sub-bitstreams.

16. The terminal according to claim 12, wherein the N dynamic adaptive streaming sub-bitstreams comprise high-resolution sub-bitstreams of to-be-played video.

17. The terminal of claim 15, wherein the method carried out by the terminal further comprises:
obtaining, in accordance with determining a field of view is switched, a new target sub-bitstream of the N sub-bitstreams based on one of the N multicast addresses;
wherein, before commencing the obtaining the new target sub-bitstream of the N target sub-bitstreams, the method further comprises obtaining a new dynamic adaptive streaming sub-bitstream corresponding to the new target sub-bitstream, by using a unicast address, of the N unicast addresses.

18. A server comprising:
a processor, and
a memory including computer-executable instructions that, when executed by the processor, cause the server to perform a method including:
receiving a video request message sent by a terminal, wherein the video request message is used to request for a VR video, wherein the VR video comprises N sub-bitstreams, and wherein each sub-bitstream of the N sub-bitstreams provides a spatial domain portion of the VR video; and
sending a video response message to the terminal,
wherein the video response message indicates N multicast addresses of the N sub-bitstreams, wherein each sub-bitstream of the N multicast sub-bitstreams is multicast transmitted according to a corresponding multicast address of the N multicast addresses;
wherein M target sub-bitstreams are obtained, based on a field of view of a user, in parallel by the terminal based on M multicast addresses respectively corresponding to the M target sub-bitstreams of the field of view,
wherein the N sub-bitstreams include the M target sub-bitstreams, and wherein the N multicast addresses include the M multicast addresses; and wherein M is an integer greater than 1 and less than N.

19. The server according to claim 18, wherein the method further includes:

determining the N sub-bitstreams and the N multicast addresses respectively corresponding to the N sub-bitstreams, wherein N is an integer greater than 1; and separately transmitting each of the N sub-bitstreams to the corresponding N multicast addresses.

20. The server according to claim 18, wherein the VR video response message further comprises feature description information of the N sub-bitstreams.

21. The server according to claim 18, wherein the N dynamic adaptive streaming sub-bitstreams comprise high-resolution sub-bitstreams of to-be-played video.

22. The server according to claim 18, wherein the VR video further comprises N dynamic adaptive streaming sub-bitstreams corresponding to the N sub-bitstreams, and wherein the video response message further indicates N unicast addresses respectively corresponding to the N dynamic adaptive streaming sub-bitstreams.

\* \* \* \* \*